(12) United States Patent
Okado

(10) Patent No.: US 11,320,351 B2
(45) Date of Patent: May 3, 2022

(54) COMPONENT EXTRACTION DEVICE

(71) Applicant: SHIMADZU CORPORATION, Kyoto (JP)

(72) Inventor: Takao Okado, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 343 days.

(21) Appl. No.: 16/347,257

(22) PCT Filed: May 29, 2017

(86) PCT No.: PCT/JP2017/019932
§ 371 (c)(1),
(2) Date: May 3, 2019

(87) PCT Pub. No.: WO2018/220682
PCT Pub. Date: Dec. 6, 2018

(65) Prior Publication Data
US 2019/0277736 A1    Sep. 12, 2019

(51) Int. Cl.
*G01N 1/40*        (2006.01)
*G01N 30/06*       (2006.01)
(Continued)

(52) U.S. Cl.
CPC .......... *G01N 1/4055* (2013.01); *B01D 11/00* (2013.01); *G01N 1/44* (2013.01); *G01N 30/02* (2013.01);
(Continued)

(58) Field of Classification Search
None
See application file for complete search history.

(56) References Cited

U.S. PATENT DOCUMENTS 4,088,458 A * 5/1978 Jourdan .................. G01N 30/30
73/23.25
5,133,859 A    7/1992 Frank et al.
2010/0261595 A1    10/2010 Schaefer et al.

FOREIGN PATENT DOCUMENTS

EP    0 444 299 A1    9/1991
JP    04-222602 A     8/1992
(Continued)

OTHER PUBLICATIONS

Written Opinion dated Aug. 15, 2017 in application No. PCT/JP2017/019932.
(Continued)

*Primary Examiner* — Daniel S Larkin
(74) *Attorney, Agent, or Firm* — Sughrue Mion, PLLC

(57) ABSTRACT

Provided is a component extraction device for eluting a component in a sample into a supercritical fluid to extract the component from the sample. The component extraction device includes: a container rack including a plurality of sample container holding parts; a rack mounting stand including a mounting section on which the container rack is mounted; a plurality of heating blocks fixedly disposed on a mounting face of the mounting section at positions respectively corresponding to the plurality of sample container holding parts; a plurality of temperature sensors each configured to detect a temperature of each of the plurality of heating blocks; and a control unit configured to respectively control the plurality of heating blocks, based on results of detection by the plurality of temperature sensors.

6 Claims, 6 Drawing Sheets

(51) Int. Cl.
    *G01N 30/02*      (2006.01)
    *B01D 11/00*      (2006.01)
    *G01N 1/44*      (2006.01)
    *B01D 11/02*      (2006.01)

(52) U.S. Cl.
    CPC .......... *G01N 30/06* (2013.01); *B01D 11/0203* (2013.01); *G01N 2001/4061* (2013.01); *G01N 2030/062* (2013.01)

(56) References Cited

FOREIGN PATENT DOCUMENTS

| | | |
|---|---|---|
| JP | 2001224953 A | 8/2001 |
| JP | 2005-172679 A | 6/2005 |
| JP | 2006-189362 A | 7/2006 |
| JP | 2009-510399 A | 3/2009 |
| JP | 2014-160055 A | 9/2014 |
| WO | 2007/039524 A2 | 4/2007 |

OTHER PUBLICATIONS

Communication dated Jun. 18, 2019 from the Japanese Patent Office in application No. 2016-026274.
"SFE Supercritical CO2 Residual Agricultural Pesticide Extraction System—JASCO Corporation", [online], [Searched May 29, 2017], 7 pages.
International Search Report of PCT/JP2017/019932 dated Aug. 15, 2017.
Communication dated Mar. 9, 2021, from the Japanese Patent Office in Application No. 2020-037362.

\* cited by examiner

COMPONENT EXTRACTION DEVICE

CROSS REFERENCE TO RELATED APPLICATIONS

This application is a National Stage of International Application No. PCT/JP2017/019932 filed May 29, 2017.

TECHNICAL FIELD

The present invention relates to a component extraction device that extracts a target component from a sample, using a supercritical fluid.

BACKGROUND ART

Supercritical fluid is a fluid at a temperature and pressure above its critical point (the critical temperature and critical pressure). The supercritical fluid exhibits excellent ability as solvent to many substances, and is thus used as solvent for extracting pesticide components in an agricultural product and for extracting medicinal components in blood, for example (Non Patent Literature 1, Patent Literature 1).

In a component extraction device that uses a supercritical fluid as the extraction solvent, the extraction solvent, such as liquefied carbon dioxide, stored in a tank is supplied to a sample container while being pressurized by a pump. The sample container is accommodated in an oven. The extraction solvent supplied to the sample container is heated in the oven, and is thus turned into a supercritical fluid. The extraction solvent which was turned into the supercritical fluid gains an eluting capability to extract a component from a sample. The extraction solvent (supercritical fluid) containing the component extracted is sent from the sample container to a detector where the component is analyzed.

CITATION LIST

Patent Literature

Patent Literature 1: JP 2005-172679 A

Non Patent Literature

Non Patent Literature 1: "SFE Supercritical CO2 Residual Agricultural Pesticide Extraction System—JASCO Corporation", [online], [Searched May 29, 2017], Internet

SUMMARY OF INVENTION

Technical Problem

In the component extraction device described above, a plurality of sample containers are accommodated in the oven set at high temperature, and the pressurized extraction solvent is supplied to the plurality of sample containers not at the same time but in a one-at-a-time manner. The sample containers, to which the extraction solvent is supplied, are kept in the oven for a predetermined period of time so as to be heated for extraction of the component. Then, liquid in each of the sample containers is sent to the detector where the component is analyzed. Therefore, the period of time for heating the extraction solvent differs among the sample containers.

The critical temperature of carbon dioxide is about 31° C. Though the critical temperature is relatively low, in a case where the component extracted from the sample has low thermal stability, elongated heating time causes the component to be altered or decomposed. Therefore, a difference in the heating time causes a variation in the analysis result of the component.

In view of the respects described above, an object of the present invention is to provide a device for extracting a component from a sample, using a supercritical fluid, the device being capable of minimizing a variation in the analysis result of the component extracted from the sample, due to heating for bringing the extraction solvent into a supercritical state.

Solution to Problem

In order to achieve the object, the present invention provides a component extraction device for eluting a component in a sample into a supercritical fluid to extract the component from the sample, the component extraction device including:

a) a container rack including a plurality of sample container holding parts;

b) a mounting section on which the container rack is mounted;

c) a plurality of heating blocks fixedly disposed on a mounting face of the mounting section at positions respectively corresponding to the plurality of sample container holding parts;

d) a plurality of temperature sensors each configured to detect a temperature of each of the plurality of heating blocks: and e) a heating controller configured to respectively control the plurality of heating blocks, based on results of detection by the plurality of temperature sensors.

Advantageous Effects of Invention

The component extraction device according to the present invention starts and stops the heating of the plurality of heating blocks, and controls the temperatures of the plurality of heating blocks respectively at an appropriate timing to extract for analysis a component from a sample in each of the plurality of sample containers held by the sample container holding parts in the container rack. The component extraction device thus minimizes a variation in the analysis results of the component extracted from the sample in each of the sample containers.

DESCRIPTION OF EMBODIMENTS

Figure 1:
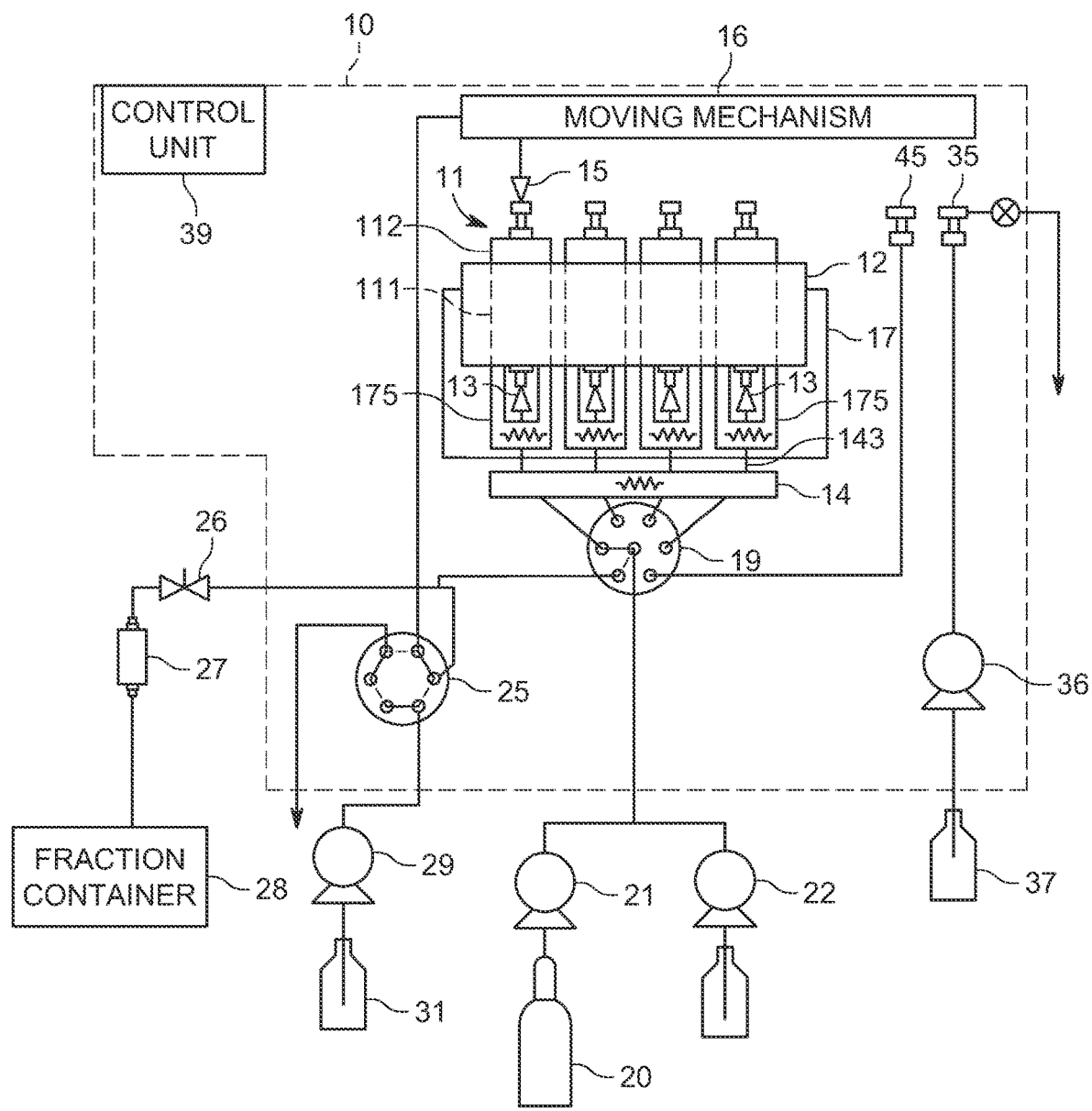
FIG. 1 is a schematic configuration diagram of a component extraction device according to an embodiment of the present invention.
Figure 2:
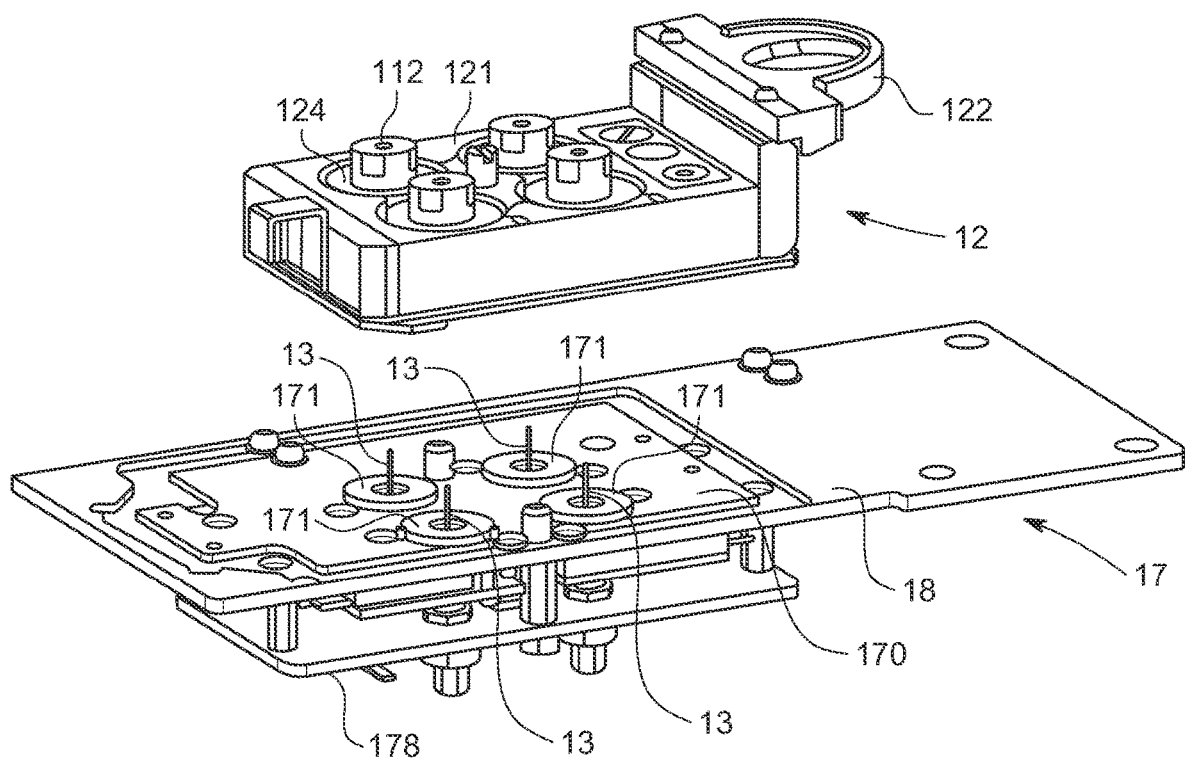
FIG. 2 is a perspective view of a rack mounting stand and a container rack where sample containers are accommodated.
Figure 3:
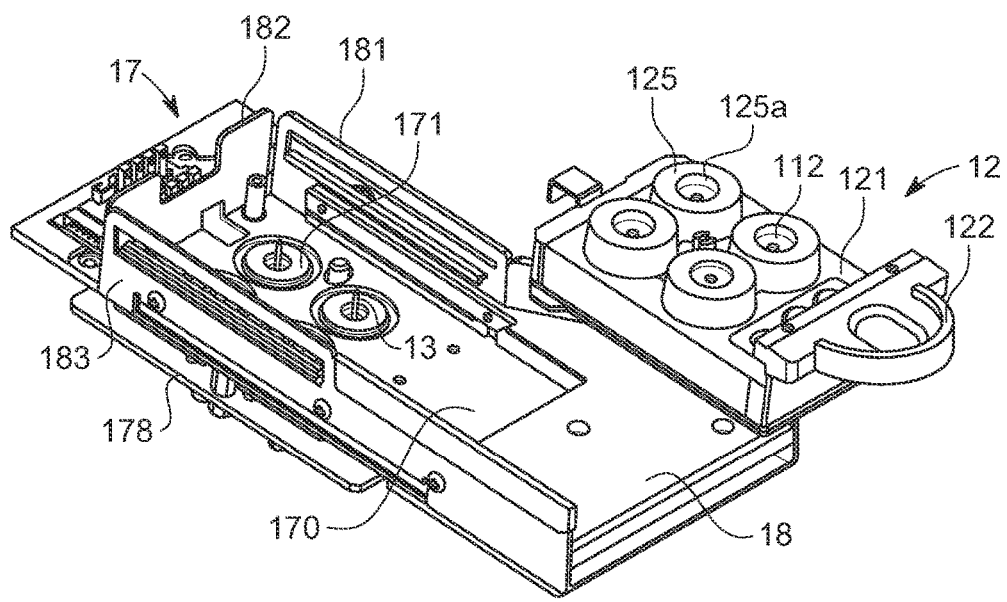
FIG. 3 is a perspective view of the rack mounting stand and the container rack where the sample containers, each having a cap mounted thereon, are accommodated.
Figure 4:
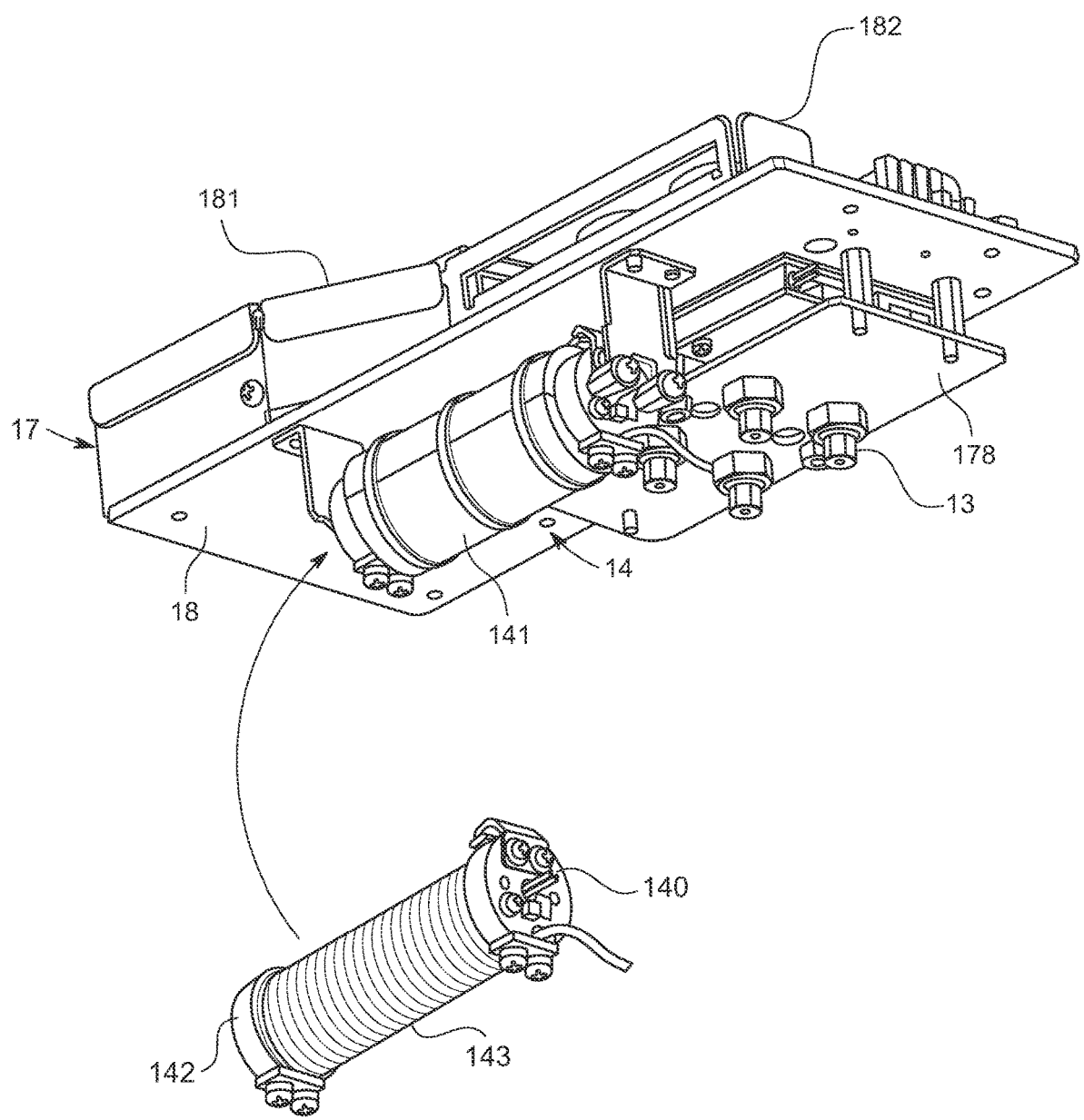
FIG. 4 is a perspective view of a bottom face of the rack mounting stand, illustrating a configuration in which a heat block is removed from an accommodating part.
Figure 5A:
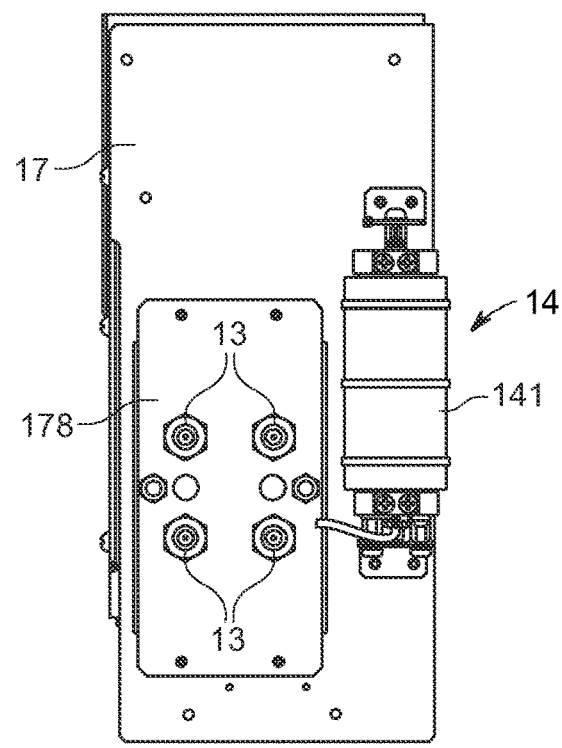
FIG. 5A is a bottom view of the rack mounting stand.
Figure 5B:
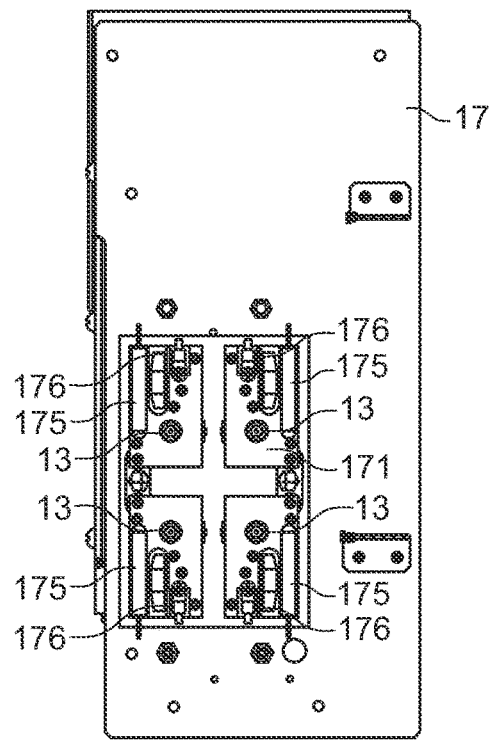
FIG. 5B is a bottom view of the rack mounting stand from which a cover plate and the accommodating part are removed.

A component extraction device according to an embodiment of the present invention will be described with reference to the drawings. FIG. 1 is a schematic configuration diagram of the component extraction device according to this embodiment. The component extraction device 10 includes: a container rack 12 capable of accommodating four sample containers 11; heating blocks 171 (see FIG. 3) disposed below the container rack 12: an outflow needle 15; a needle moving mechanism 16 disposed above the container rack 12 and configured to move the outflow needle 15 leftward and rightward as well as upward and downward; and a rack mounting stand 17 on which the container rack 12 is mounted. Each of the sample containers 11 includes a main body 111 having a cylindrical shape, and a lid portion 112 fixed to an upper end of the main body 111. Each of the sample containers 11 has an inflow opening at a center of its lower end, and an outflow opening at a center of its upper end.

The rack mounting stand 17 holds four inflow needles 13 to be respectively inserted into the inflow openings of the sample containers 11 in the container rack 12. The four inflow needles 13 are respectively connected to four ports in a flow passage switching valve 19. The flow passage switching valve 19 has one of the ports to which a carbon dioxide cylinder 20, a pressurizing pump 21, and a modifier pump 22 are connected. The pressurizing pump 21 pressurizes carbon dioxide flowing out of the carbon dioxide cylinder 20 to supply the carbon dioxide to the inflow needles 13. The modifier pump 22 supplies a modifier (modifier agent) to the inflow needles 13. The needle moving mechanism 16 is connected, via a flow passage switching valve 25, to a back pressure regulating valve 26, a trap column 27, and a fraction container (fraction collector) 28 in this order. The flow passage switching valve 25 is connected to an eluting solvent container 31 via an eluting pump 29. A passage connecting the flow passage switching valve 25 to the back pressure regulating valve 26 is connected to one end of another flow passage the other end of which is connected to one of the ports of the flow passage switching valve 19.

The component extraction device 10 has a needle outer periphery washing port 35 and a needle inner face washing port 45. The needle outer periphery washing port 35 is connected to a rinse solution container 37 via a rinse pump 36. The needle inner face washing port 45 is connected to one of the ports of the flow passage switching valve 19.

The heating blocks 171, the needle moving mechanism 16, the flow passage switching valve 19, the flow passage switching valve 25, and others in the component extraction device 10 are controlled by a control unit 39 including a computer.

With reference to FIGS. 2 to 5B, next, a description will be given of a structure of the container rack 12 and a structure of the rack mounting stand 17.

The container rack 12 includes a holding member 121 having a rectangular plate shape, and a grip member 122 disposed at one end of the holding member 121. The holding member 121 has four holes into which cylindrical members 124 made of metal are respectively fitted. Each of the cylindrical members 124 corresponds to a sample container holding part and a heat conductive member according to the present invention. The cylindrical members 124 have bottom portions exposed on a bottom face of the container rack 12, and a fine hole (not illustrated) is formed at a center of each bottom portion. When the sample containers 11 are inserted into the cylindrical members 124, the inflow openings of the sample containers 11 opposes the fine holes. In a state that the sample containers 11 are inserted into the cylindrical members 124, a cap 125 of screw-in type is mounted on an upper end of each sample container 11. This configuration prevents the sample containers 11 inserted into the cylindrical members 124 from slipping out of the cylindrical members 124. The caps 125 have openings 125a formed in correspondence with the outflow openings of the sample containers 11. The outflow needle 15 is inserted into the outflow opening of one of the sample containers 11 in the container rack 12, through the corresponding the opening 125a.

The rack mounting stand 17 includes a plate member 18, a sidewall 181, a sidewall 182, and a sidewall 183. The plate member 18 has a rectangular shape and is larger than the container rack 12 as seen in plan view. The sidewalls 181 to 183 are attached to three of the four sides of the plate member 18 although not illustrated in FIG. 2. An area where the sidewalls 181 to 183 are not provided (a right end area in FIG. 3) corresponds to an insertion opening for the container rack 12 onto the rack mounting stand 17. The rack mounting stand 17 has, on its upper face, a mounting section 170 that is a shallow recess having a shape corresponding to the holding member 121 of the container rack 12. The mounting section 170 is formed close to an opposite side to the insertion opening. The heating blocks 171, the number of which is four, are fixed to the rack mounting stand 17. The heating blocks 171 are fixed across between the upper and lower faces of the rack mounting stand 17. Each of the heating blocks 171 is formed in a ring shape on the upper face of the rack mounting stand 17 and is formed in a rectangular plate shape on the lower face of the rack mounting stand 17. Each of the heating blocks 171 has a hole at its center. The inflow needles 13 are fixed to a cover plate 178, and one ends thereof are disposed in the holes. When the container rack 12 is mounted on the mounting section 170, the bottom portions of the cylindrical members 124 abut against the upper faces of the heating blocks 171. At this time, one ends of the inflow needles 13 are inserted into the inflow openings of the sample containers 11 held by the cylindrical members 124.

A preheater 14 is attached to a bottom face of the rack mounting stand 17. A heater 175 and a temperature sensor 176 are attached to each of the four heating blocks 171 at positions on the lower face of the rack mounting stand 17. The control unit 39 turns on and off each heater 175, based on a result of detection by the corresponding temperature sensor 176, so as to adjust a temperature of the corresponding heating block 171 at a predetermined temperature. Therefore, in this embodiment, the heaters 175 and the control unit 39 constitute a heating controller.

The preheater 14 includes an accommodating part 141, a heat block 142, and a heater 140 (e.g., a cartridge heater). The accommodating part 141 is disposed on the lower face of the rack mounting stand 17. The heat block 142 is made of a metal with high heat conduction properties (e.g., aluminum), and is accommodated in the accommodating part 141. The heater 140 has a rod shape and is accommodated in the heat block 142. A conduit 143 is wound around an outer periphery of the heat block 142. The conduit 143 constitutes a flow passage between the flow passage switching valve 19 and each of the inflow needles 13. With this configuration, carbon dioxide (extraction solvent) drawn out of the carbon dioxide cylinder 20 and pressurized by the pressurizing pump 21 and a modifier drawn out of a container by the modifier pump 22 are heated before flowing into each of the sample containers 11.

The cover plate 178 is attached to the lower face of the rack mounting stand 17 to cover the four heating blocks 171. The other ends of the inflow needles 13 are attached to the cover plate 178.

Figure 6A:
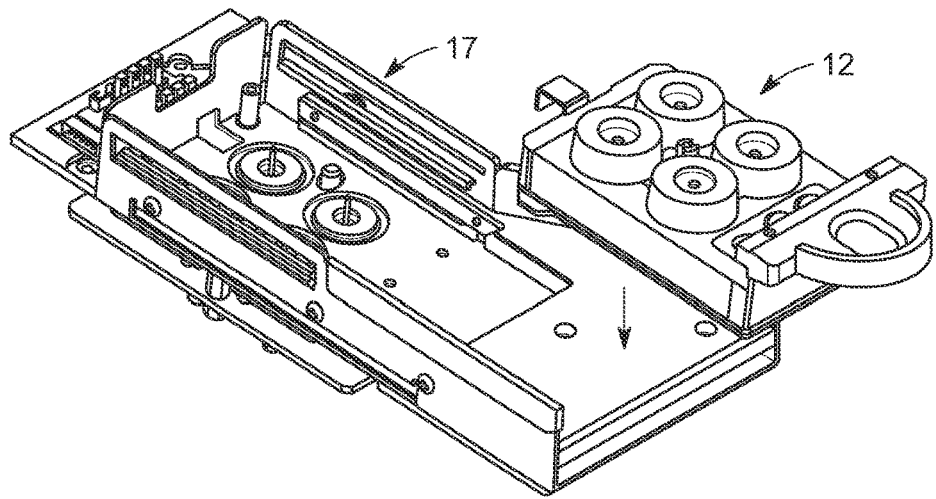
FIGS. 6A to 6C are views illustrating how the container rack is guided onto a mounting section of the rack mounting stand.
Figure 6B:
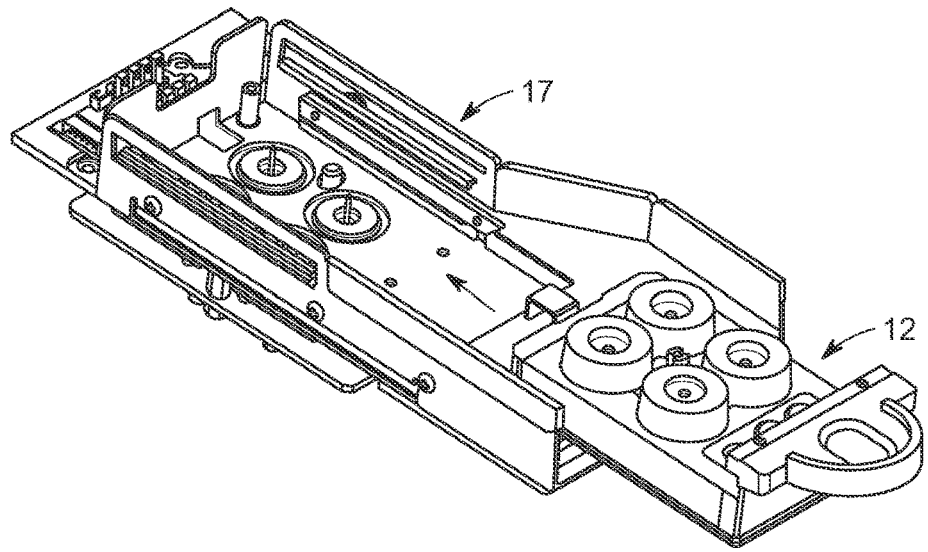
Figure 6C:
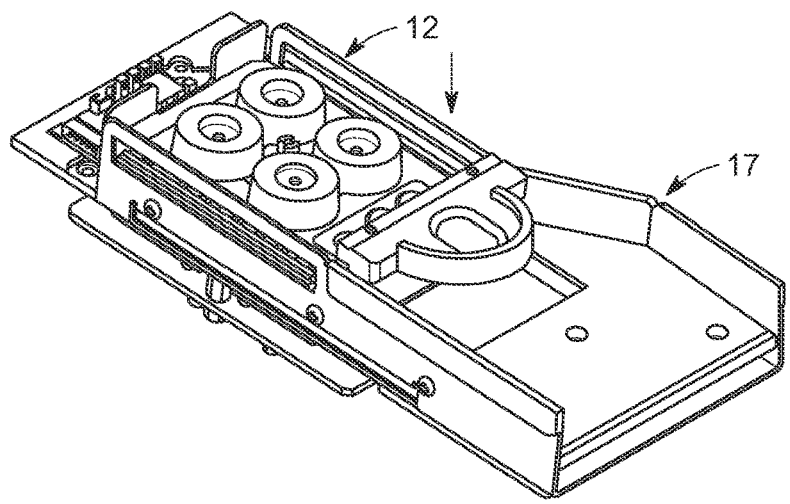

The sidewalls 181 and 183 are provided on both sides of the insertion opening of the rack mounting stand 17 such that a distance therebetween near the mounting section 170 is smaller than a distance therebetween near the insertion opening. With this configuration, as illustrated in FIG. 6A, when the container rack 12 is placed on and inserted into the wider insertion opening in the rack mounting stand 17, then the container rack 12 is guided along the sidewalls 181 and 183 on both the sides of the insertion opening to move toward the mounting section 170 (see FIGS. 6B and 6C).

In the component extraction device 10 described above, when a component is extracted from a sample in each of the sample containers 11, the sample containers 11 are accommodated in the container rack 12 and the caps 125 are mounted on the upper ends of the sample containers 11. When the container rack 12 is inserted into the device and is placed on the insertion opening of the rack mounting stand 17, as previously described, the container rack 12 is guided along the sidewalls of the rack mounting stand 17 to move onto the mounting section 170. With this configuration, the cylindrical members 124 in the container rack 12 are placed on the heating blocks 171, and one ends of the inflow needles 13 enter the inflow openings of the sample containers 11 in the cylindrical members 124. At this time, the flow passage switching valves 19 and 25 are set in a state shown with a broken line in FIG. 1.

Subsequently, the flow passage switching valves 19 and 25 are switched to a state shown with a solid line in FIG. 1. Concurrently, the back pressure regulating valve 26 is set at a predetermined pressure (e.g., a pressure of approximately 7 MPa or more as the critical pressure of carbon dioxide in a supercritical fluid state), and the heater 140 in the preheater 14 is set at a predetermined temperature (e.g., a temperature of approximately 31° C. or more as the critical temperature of carbon dioxide in a supercritical fluid state). In this state, carbon dioxide is supplied to one of the sample containers 11 by the pressurizing pump 21. In addition, a modifier agent (modifier) as polar solvent (e.g., methanol, ethanol) is supplied to the sample containers 11 by the modifier pump 22. The carbon dioxide is brought into a supercritical state, exhibiting excellent ability as solvent, and thus dissolves the sample in each sample container 11. Further, the heater 175 of each heating block 171 is operated at an appropriate timing when the supercritical fluid flows into the corresponding sample container 11, so that the heating block 171 is heated at a predetermined temperature. Then, heat from the heating block 171 is conducted to the corresponding cylindrical member 124 in the container rack 12, so that the sample container 11 held by the container rack 12 is heated. The supercritical fluid flowing into the sample container 11 is thus maintained at the supercritical state. Consequently, a component is extracted from the sample in the sample container 11.

The supercritical fluid containing the component flows from the outflow needle 15 into the trap column 27 via the flow passage switching valve 25. The carbon dioxide in the supercritical state passes through the back pressure regulating valve 26 immediately before flowing into the trap column 27. Therefore, the carbon dioxide is not in a supercritical state and is turned into a gaseous state. The carbon dioxide thus causes a loss of the ability as solvent. As a result, the component extracted from the sample remains in the trap column 27. Then, the flow passage switching valve 25 is switched to a state shown with a dotted line in FIG. 1, and the solvent in the eluting solvent container 31 is sent to the trap column 27 via the eluting pump 29, so that the component trapped in the trap column 27 is collected in the fraction container (fraction collector) 28. The component is analyzed by chromatographic analysis of a solution containing the collected component.

In order to analyze a component in a sample of the other sample containers 11, the pressurizing pump 21 is put out of operation, and the outflow needle 15 is moved to be inserted into the outflow opening of one of the other sample containers 11 by the needle moving mechanism 16. The flow passage switching valve 19 is switched so that the inflow needle 13 corresponding to the sample container 11 is connected to the pressurizing pump 21 and the modifier pump 22. In order to heat the heating block 171 corresponding to the sample container 11, the corresponding heater 175 is put into operation. Then, operations from extraction of a component to analysis of the component are performed as in the procedures above. Concurrently, with the sample container 11 of which the sample analysis has been completed, the corresponding heater 175 for heating the corresponding heating block 171 is put out of operation.

Figure 7:
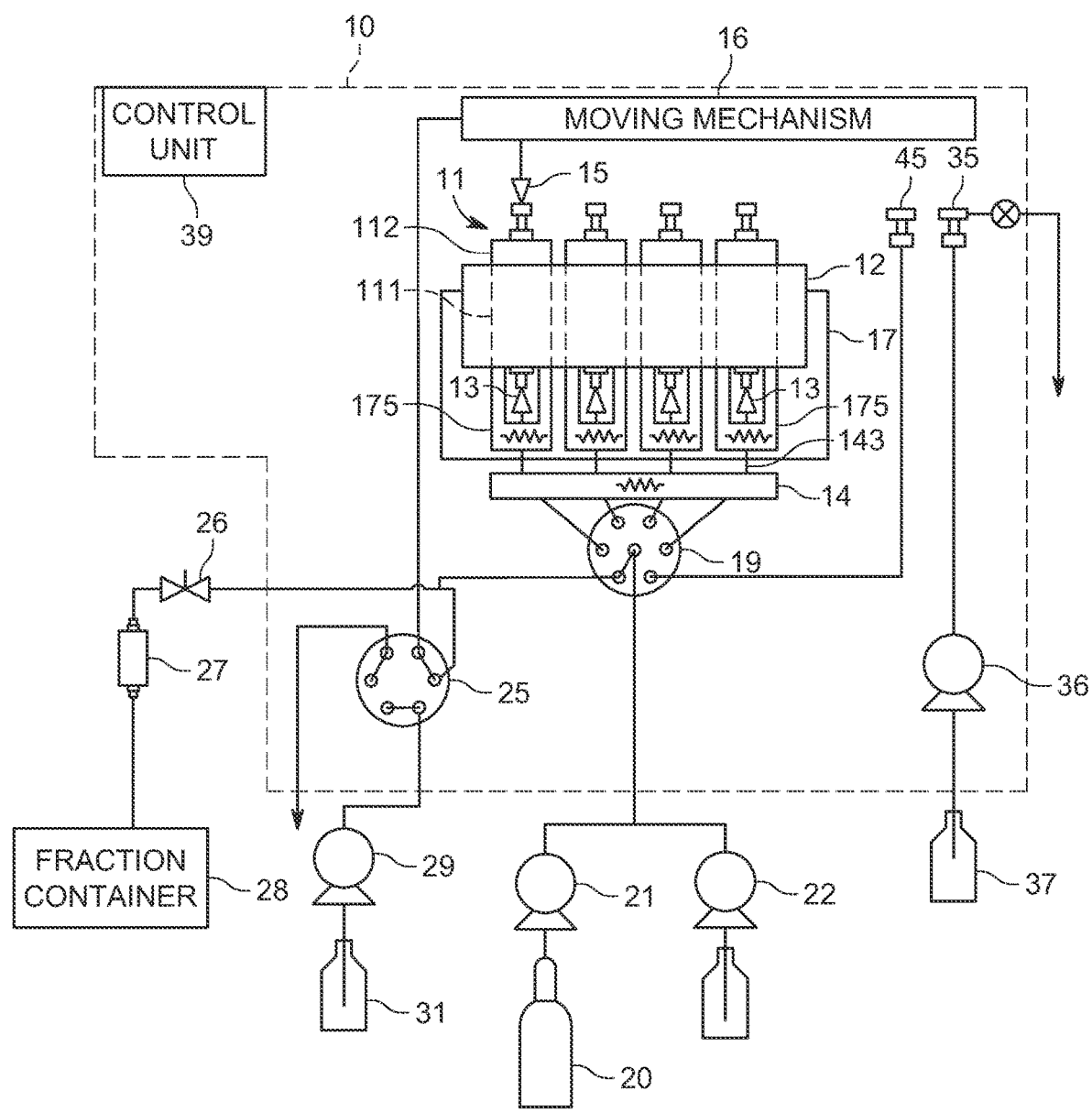
FIG. 7 is a schematic diagram of a flow passage configuration of the component extraction device according to this embodiment in static extraction.

This configuration enables the solvent (the supercritical fluid and the modifier) to flow consecutively into the sample containers 11, to extract the component from the sample in each of the sample containers 11 (a typically called "dynamic extraction"), and to fractionally collect the component via the trap column 27. On the other hand, in a case where each of the sample containers 11 is temporarily filled with the solvent and the component is extracted from the sample by being eluted into the solvent in a static condition (a typically called "static extraction"), the flow passage switching valves 19 and 25 are switched to a state illustrated in FIG. 7. In this state, each of the supercritical fluid and the modifier flows from the outflow needle 15 into each of the sample containers 11.

As described above, the component extraction device according to this embodiment heats each of the heating blocks 171 at an appropriate timing to extract a component from a sample, and enables equalization of heating time among the sample containers 11 accommodated in the container rack 12. The component extraction device according to this embodiment thus minimizes a variation in the analysis results of the component extracted from each of the sample containers 11.

In addition, in the foregoing embodiment, the preheater 14 is attached on the lower face of the rack mounting stand 17, causing the extraction solvent, in the case of dynamic extraction, to be brought into a supercritical state immediately before flowing into each of the sample containers 11 and also causing the extraction solvent to be maintained at the supercritical state when flowing into each of the sample containers 11.

It should be noted that the present invention is not limited to the foregoing embodiment, and various modifications may be appropriately made within the scope of the present invention. For example, in the foregoing embodiment, the preheater 14 has the conduit 143 wound around the heat block 142 in which the heater 140 is accommodated. Alternatively, the preheater 14 may have a configuration where the heat block 142 is not provided and the conduit 143 is directly wound around the heater 140.

REFERENCE SIGNS LIST

10 . . . Component Extraction Device
11 . . . Sample Container
12 . . . Container Rack
121 . . . Holding Part
122 . . . Grip Part
124 . . . Cylindrical Member (Sample Container Holding Part)
125 . . . Cap
13 . . . Inflow Needle
14 . . . Preheater
140 . . . Heater
141 . . . Accommodating Part
142 . . . Heat Block
143 . . . Conduit
15 . . . Outflow Needle
16 . . . Needle Moving Mechanism
17 . . . Rack Mounting Stand
171 . . . Heating Block
175 . . . Heater
176 . . . Temperature Sensor
19, 25 . . . Flow Passage Switching Valve
39 . . . Control Unit

The invention claimed is:

1. A component extraction device configured for eluting a component in a sample into a supercritical fluid to extract the component from the sample,
the component extraction device comprising:
a) a container rack including a plurality of sample container holding parts into which a plurality of sample containers are respectively inserted;
b) a rack mounting stand including a mounting section on which the container rack is mounted;
c) a plurality of heating blocks fixedly disposed on a mounting face of the mounting section at positions respectively corresponding to the plurality of sample container holding parts;
d) a heating controller configured to respectively control the plurality of heating blocks, wherein the heating controller controls each of the plurality of heating blocks to be operated at an appropriate timing when supercritical fluid flows into each of the plurality of sample containers corresponding to the each of the plurality of heating blocks; and
e) a preheater attached to the mounting section, wherein a flow passage configured to supply supercritical fluid to each of the plurality of sample containers is wound around the preheater.

2. The component extraction device according to claim 1, wherein
each of the plurality of sample container holding parts includes a heat conductive member fixed to the container rack, and
the heat conductive member is thermally in contact with a corresponding one of the plurality of heating blocks on condition that the container rack is mounted on the mounting section.

3. The component extraction device according to claim 1, further comprising
a plurality of inflow needles configured for flowing supercritical fluid into the plurality of sample containers, wherein the plurality of sample container holding parts have bottom portions exposed on a bottom face of the container rack, each of the bottom portions having a first hole at its center and each of inflow openings of the plurality of sample containers opposing the corresponding first hole when the plurality of sample containers are inserted into the plurality of sample container holding parts;
each of the plurality of heating blocks is formed in a ring shape and has a second hole configured for disposing one of the plurality of inflow needles at its center; and
the bottom portions of the plurality of sample container holding parts abut against upper faces of the plurality of heating blocks and the plurality of inflow needles are inserted into the inflow openings of the plurality of sample containers held by the plurality of sample container holding parts when the container rack is mounted on the mounting section.

4. A component extraction device configured for eluting a component in a sample into a supercritical fluid to extract the component from the sample,
the component extraction device comprising:
a) a container rack including a plurality of sample container holding parts into which a plurality of sample containers are respectively inserted;
b) a rack mounting stand including a mounting section on which the container rack is mounted;
c) a plurality of heating blocks fixedly disposed on a mounting face of the mounting section at positions respectively corresponding to the plurality of sample container holding parts;
d) a heating controller configured to respectively control the plurality of heating blocks, wherein the heating controller controls each of the plurality of heating blocks to be operated at an appropriate timing when supercritical fluid flows into each of the plurality of sample containers corresponding to the each of the plurality of heating blocks; and
e) an outflow needle configured for flowing out supercritical fluid from the plurality of sample containers, wherein
each of the plurality of sample containers has a cap of screw-in type mounted on an upper end of the sample container;
the cap is configured to prevent the sample container inserted into the sample container holding part with the cap mounted to the upper end of it from slipping out of the sample container holding part; and
the cap has an opening in correspondence with an outflow opening of the sample container and the outflow needle is inserted into the outflow opening of the sample container in the container rack through the opening of the cap.

5. A component extraction device configured for eluting a component in a sample into a supercritical fluid to extract the component from the sample,
the component extraction device comprising:
a) a container rack including a plurality of sample container holding parts into which a plurality of sample containers are respectively inserted;
b) a rack mounting stand including a mounting section on which the container rack is mounted;
c) a plurality of heating blocks fixedly disposed on a mounting face of the mounting section at positions respectively corresponding to the plurality of sample container holding parts; and d) a heating controller configured to respectively control the plurality of heating blocks, wherein the heating controller controls each of the plurality of heating blocks to be operated at an appropriate timing when supercritical fluid flows into each of the plurality of sample containers corresponding to the each of the plurality of heating blocks, wherein the rack mounting stand includes a rectangular plate member, three sidewalls attached to three of four sides of the plate member, and an area where the sidewalls are not provided corresponds to an insertion opening for the container rack onto the rack mounting stand; and the plate member is larger than the container rack as seen in plan view.

6. The component extraction device according to claim 5, wherein the sidewalls are provided on both sides of the insertion opening of the rack mounting stand such that a distance therebetween near the mounting section smaller than a distance therebetween near the insertion opening; and the container rack is guided along the sidewalls on both sides of the insertion opening to move toward the mounting section when the container rack is placed on and inserted into the insertion opening of the rack mounting stand.

* * * * *